United States Patent
Goubeaux et al.

(10) Patent No.: US 6,381,545 B1
(45) Date of Patent: Apr. 30, 2002

(54) DIAGNOSTIC METHOD FOR AN AUTOMOTIVE HVAC COMPRESSOR

(75) Inventors: Ronald Joseph Goubeaux, Lockport; Taylor R. Eckstein, Jr., N. Tonawanda; Timothy M. Gabel, Tonawanda; Thomas Martin Urbank, Lockport, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/482,383

(22) Filed: Jan. 12, 2000

(51) Int. Cl.⁷ ............................. G01B 5/28; G01B 5/30; G06F 19/00
(52) U.S. Cl. ..................... 702/35; 62/126; 62/129
(58) Field of Search .................. 702/47, 35, 70, 702/81, 113; 62/126, 129, 133, 158, 323.4, 151; 701/102, 36, 51; 165/42; 192/130 R, 84.961

(56) References Cited

U.S. PATENT DOCUMENTS

| | | | | |
|---|---|---|---|---|
| 4,561,261 A | * | 12/1985 | Kornrumf et al. | 62/126 |
| 4,877,118 A | * | 10/1989 | Tamura | 192/103 R |
| 5,059,097 A | * | 10/1991 | Okazaki et al. | 417/222.2 |
| 5,497,870 A | * | 3/1996 | Takashi | 192/84.96 |
| 5,507,152 A | * | 4/1996 | Iwata et al. | |
| 5,586,445 A | * | 12/1996 | Bessler | 62/126 |
| 5,761,917 A | * | 6/1998 | Corcoran et al. | 62/133 |
| 5,931,008 A | * | 8/1999 | Mizutani et al. | 62/126 |
| 5,937,979 A | * | 8/1999 | Cummings | 192/18 A |
| 6,029,465 A | * | 2/2000 | Bascobert | 62/227 |
| 6,092,380 A | * | 7/2000 | Kachur et al. | 62/228.3 |
| 6,230,504 B1 | * | 5/2001 | Grass et al. | 62/133 |
| 6,249,726 B1 | * | 6/2001 | Burke, II et al. | 701/29 |

* cited by examiner

Primary Examiner—Marc S. Hoff
Assistant Examiner—Demetrius Pretlow
(74) Attorney, Agent, or Firm—Patrick M. Griffin

(57) ABSTRACT

An improved method and apparatus for diagnosing the condition of an automotive HVAC refrigerant compressor based on information contained within the signal produced by a high-side pressure sensor provided for system control purposes. The output signal of the pressure sensor is divided into its DC and AC components, with the DC component being used for system control purposes, and the AC component being used for diagnosing the condition of the compressor. Pulsations of the AC component (which conventionally are removed by filtering for control purposes) correspond to individual piston stroke cycles. The pulsations indicate compressor operation and are counted for purposes of determining the actual compressor speed. Since existing pressure sensor information is utilized to verify compressor operation and to determine compressor speed, the system cost impact due to the diagnostic evaluation is minimal. Moreover, the pulsations provide failure information that could not be detected by a speed sensor since the pulsations verify that work is actually being performed by the compressor.

7 Claims, 3 Drawing Sheets

DIAGNOSTIC METHOD FOR AN AUTOMOTIVE HVAC COMPRESSOR

TECHNICAL FIELD

This invention relates to on-board diagnostics for the refrigerant compressor of an automotive HVAC system, and more particularly to a diagnostic method that utilizes existing sensor information.

BACKGROUND OF THE INVENTION

A significant aspect of state-of-the-art automotive engine control pertains to so-called on-board-diagnosis of various engine components or sensors, particularly when improper operation of such components or sensors can adversely influence the engine emission controls. In the case of a vehicle heating, ventilation and air-conditioning (HVAC) system that includes an clutch-driven refrigerant compressor and an electrically activated clutch mechanism, the diagnosis involves determining whether the compressor is on-normal, on-abnormal, off-normal, or off-abnormal. The on-normal condition indicates that the compressor is actually on (running) when the clutch is commanded on, and the off-normal condition indicates that the compressor is actually off when the clutch is commanded off. The off-abnormal condition indicates that the compressor is not running properly when the clutch is commanded on, and the on-abnormal condition indicates that the compressor is running when the clutch is commanded off. In addition to catastrophic failures such as a seized compressor, the abnormal conditions may be due to clutch failure or slippage, or a control unit failure. As with any diagnostic evaluation, the abnormal diagnostic indications may be used to trigger a check engine lamp or other driver alert so that the detected faulty operation can be corrected.

While the above-described conditions may be logically diagnosed by comparing the compressor speed with the clutch command, a measure of the compressor speed is not ordinarily available. Adding a compressor speed sensor for this purpose would significantly increase system cost, and is therefore undesirable. Accordingly, what is needed is a method of diagnosing the compressor condition without adding a special-purpose sensor.

SUMMARY OF THE INVENTION

The present invention is directed to an improved method for diagnosing the condition of an automotive HVAC refrigerant compressor based on information contained within the signal produced by a high-side pressure sensor provided for system control purposes. According to this invention, the output signal of the pressure sensor is divided into its DC and AC components, with the DC component being used for system control purposes, and the AC component being used for diagnosing the condition of the compressor. Pulsations of the AC component (which conventionally are removed by filtering for control purposes) correspond to individual piston stroke cycles. The pulsations indicate compressor operation and are counted for purposes of determining the actual compressor speed.

Since existing pressure sensor information is utilized to verify compressor operation and to determine compressor speed, the system cost impact due to the diagnostic evaluation is minimal. Moreover, the pulsations provide failure information that could not be detected by a speed sensor since the pulsations verify that work is actually being performed by the compressor.

DESCRIPTION OF THE PREFERRED EMBODIMENT

Figure 1:
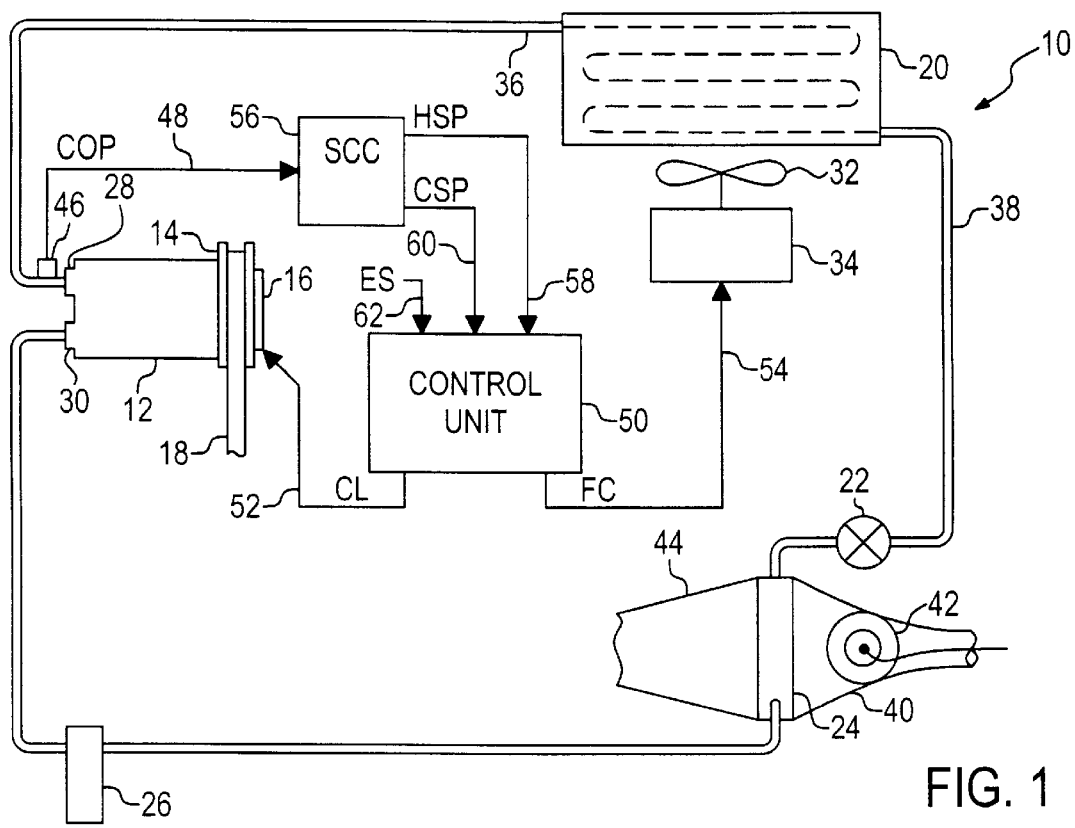
FIG. 1 is a system diagram of an automotive HVAC system according to this invention, including a pressure sensor, a signal conditioning circuit, and a microprocessor-based control unit.

Referring to FIG. 1, the reference numeral 10 generally designates an automotive HVAC system, including a refrigerant compressor 12 coupled to a drive pulley 14 via an electrically activated clutch 16. The compressor 12 may have a fixed displacement or a variable displacement with pneumatic or electronic displacement control. The pulley 14 is coupled to a rotary shaft of the vehicle engine (not shown) via drive belt 18, and the clutch 16 is selectively engaged or disengaged to turn the compressor 12 on or off, respectively. The HVAC system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from the high pressure refrigerant in line 36. The orifice tube 22 allows the cooled high pressure refrigerant in line 38 to expand before passing through the evaporator 24. An air intake duct 40 housing an electric ventilation fan 42 directs outside (and/or recirculated) air through the evaporator 24, and a heating duct 44 distributes the conditioned air in the vehicle passenger compartment. The accumulator/dehydrator 26 separates low pressure gaseous and liquid refrigerant, and directs the gaseous portion to the compressor suction port 30.

In an alternative system configuration, the orifice tube 22 is replaced with a thermostatic expansion valve (TXV). In this case, the accumulator/dehydrator 26 is omitted, and a receiver/drier (RID) is inserted in line 38 upstream of the TXV.

The compressor 12 includes a number of internal reciprocating pistons (not shown) that successively and repeatedly pump refrigerant into the high pressure pipe 36 when the clutch 16 is engaged. The refrigerant pressure in pipe 36 is detected by a pressure transducer 46, which develops a compressor outlet pressure (COP) signal on line 48. As in conventional controls, the DC component of the COP signal is used for one or more control purposes, including cycling the cooling fan motor 34 to optimize cooling and driveability concerns, cycling the clutch 16 to account for various ambient conditions, and disengaging the clutch 16 in the event of an abnormally high compressor outlet pressure. These functions are carried out by the microprocessor-based control unit 50, which develops a clutch control signal (CL) on line 52 and a fan control signal (FC) on line 54.

According to this invention, the control unit 50 additionally utilizes the AC component of the of COP signal for purposes of diagnosing the operation of compressor 12. To this end, the COP signal on line 48 is applied as an input to the signal conditioning circuit (SCC) 56, described in detail below in reference to FIGS. 2–3. As indicated in FIG. 1, SCC 56 produces two output signals: a high side pressure (HSP) signal on line 58 and a compressor speed pulse (CSP) signal on line 60. The HSP signal on line 58 is based on the DC component of the COP signal, and is used by control unit 50 for control purposes as discussed above. The CSP signal on line 60 is based on the AC component of the COP signal, and is used by control unit 50 for purposes of diagnosing the operation of compressor 12. An engine speed signal (ES) on line 62 enables enhanced diagnostic evaluation, as described below in reference to FIG. 4.

Figure 2:
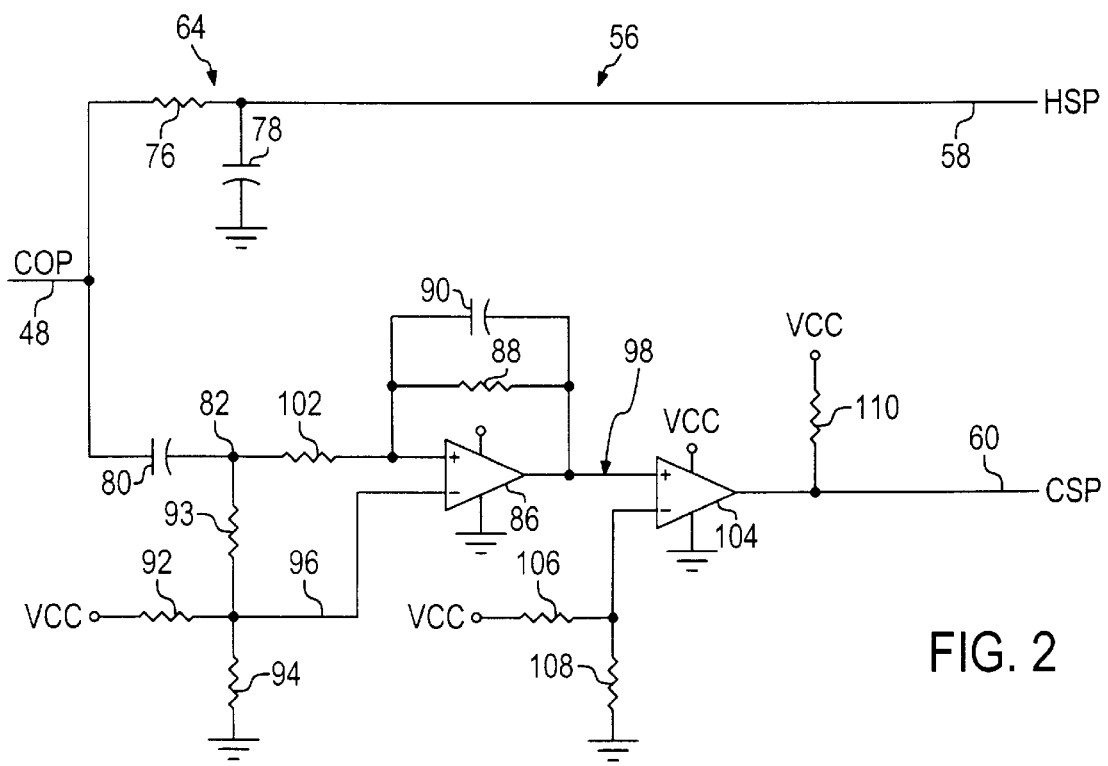
FIG. 2 is a diagram of the signal conditioning circuit of FIG. 1.
Figure 3:
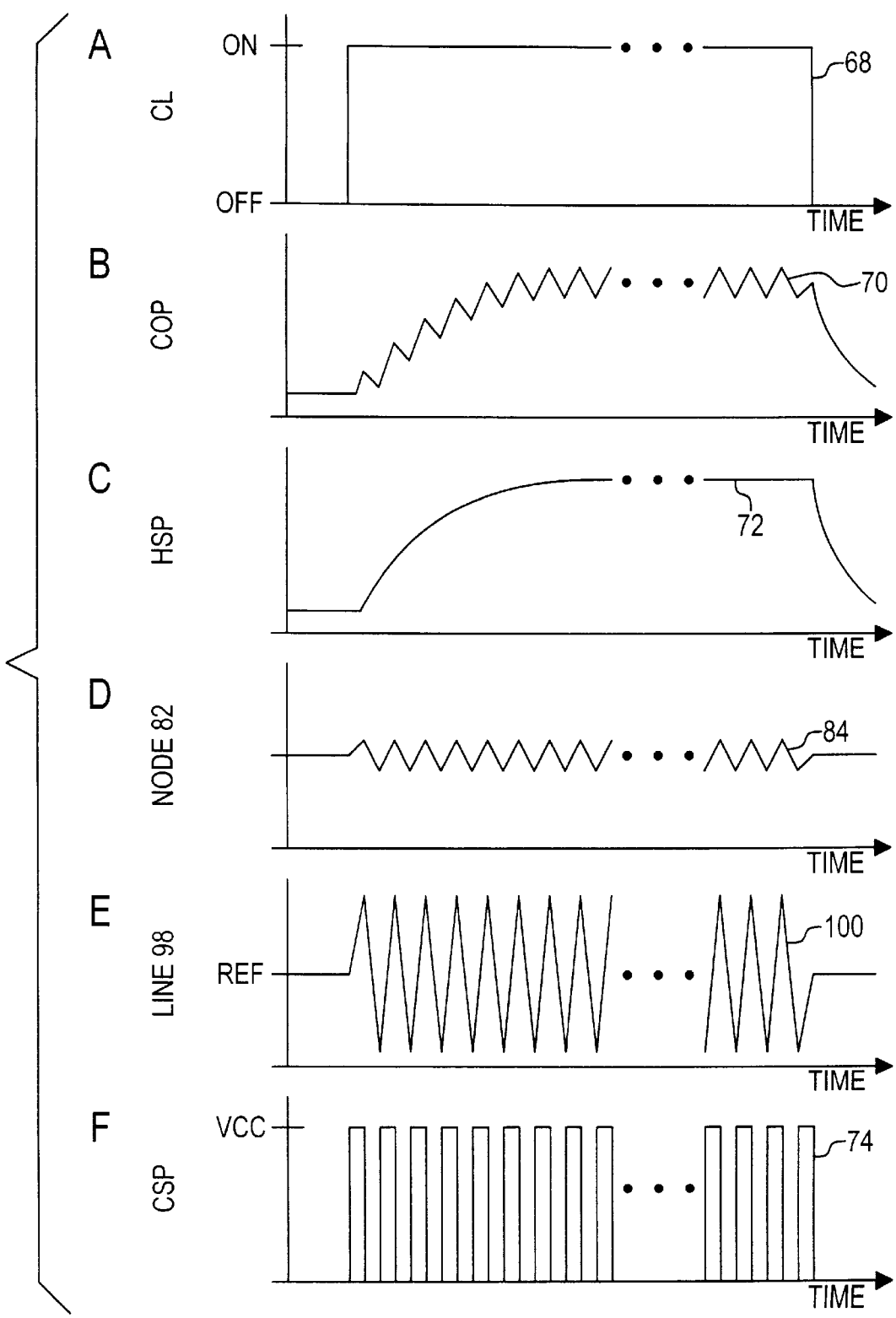
FIG. 3, Graphs A–F, graphically depict representative signals occurring in the signal conditioning circuit of FIG. 2.

FIG. 2 depicts the signal conditioning circuit SCC 56, and Graphs A–F of FIG. 3 show representative waveforms at various points in the circuit, on a common time base. As seen in FIG. 2, the COP signal on line 48 is applied to two circuits: a low pass filter 64 for forming the HSP signal on line 58, and an AC-coupled differentiator and squaring circuit 66 for forming the CSP signal on line 60. In an abbreviated period of clutch engagement represented by the ON level of trace 68 in Graph A of FIG. 3, the COP, HSP and CSP signals are depicted by the traces 70, 72 and 74 in Graphs B, C and F, respectively.

As indicated above, the compressor pumping events or cycles are directly responsible for the pulsations seen in the COP signal of Graph B, FIG. 2. These pulsations are detrimental for control purposes, and the series resistor 76 and shunt capacitor 78 of low-pass filter 64 effectively remove the pulsations to form the HSP signal of Graph C, which represents the DC component of the COP signal. A representative time constant for the filter 64 would be approximately 100 msec. In circuit 66, the series capacitor 80 isolates the pulsations. The signal at node 82 therefore corresponds to the AC component of the COP signal, and is depicted by the trace 84 in Graph D. The DC offset in trace 84 is determined by the resistors 92–94, which divide a source voltage VCC. A differentiator comprising the operational amplifier 86 and the feedback elements 88 and 90 amplify AC portion of the signal (i.e., the pulsations), and the resistors 92 and 94 provide a reference offset voltage (REF) on line 96, resulting in a differentiator output on line 98 as shown in the trace 100 of Graph E. The differentiator time constant, which may be on the order of 0.5 msec, is defined by the feedback elements 88, 90, and the gain is defined by the relative resistance values of elements 88 and 102. The pulse amplitude of the offset AC signal on line 98 can be used for diagnostic purposes as a measure of the pumping capacity of compressor 12, if desired. In FIG. 2, the signal on line 98 is applied to a squaring circuit comprising the comparator 104, forming the CSP signal on line 60. The resistors 106 and 108 divide the source voltage VCC to provide a reference voltage (which may be the same as offset voltage REF) to the inverting input of comparator 104, and the pull-up resistor 110 holds line 60 at VCC when the voltage on line 98 exceeds the reference voltage. When the voltage on line 98 is below the reference voltage, the comparator holds line 60 at ground potential, resulting in the square-wave, or pulsation, trace 74 depicted in Graph F.

Figure 4:
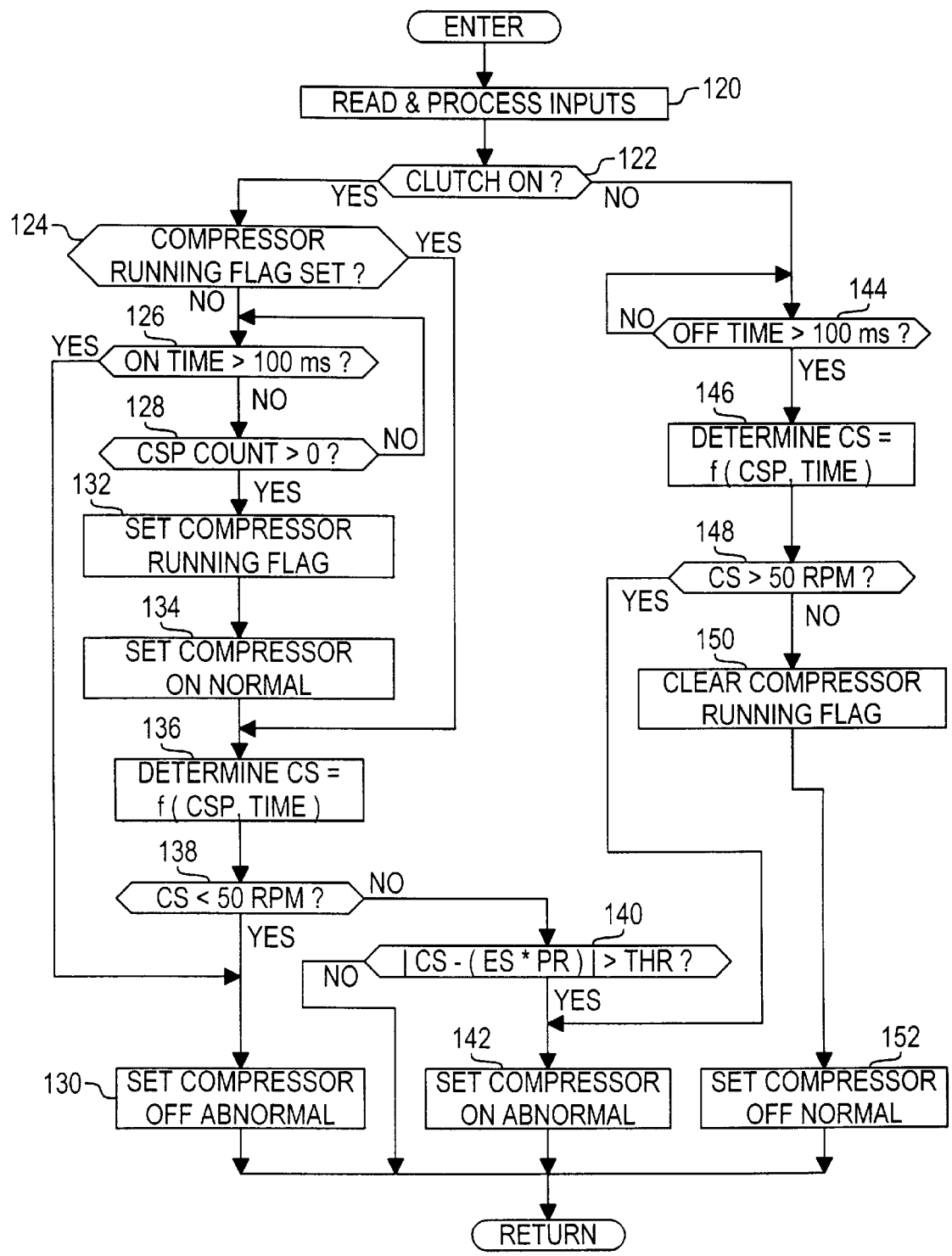
FIG. 4 is a flow diagram representative of computer program instructions executed by the control unit of FIG. 1 in carrying out the compressor diagnosis according to this invention.

The flow diagram of FIG. 4 represents a software routine executed by the control unit 50 in carrying out a diagnostic evaluation of compressor 12 based on the CSP and ES signals. As indicated, the control unit 50 executes other software routines for controlling the compressor clutch 16 and cooling fan motor 34 via lines 52 and 54. As part of such other controls, the control unit 50 controls the status of a CLUTCH ON flag to indicate whether the clutch 16 is being commanded on or off.

Referring to FIG. 4, the block 120 is first executed to read and process the relevant inputs, including the CSP signal on line 60 and the ES signal on line 62. Processing of the inputs may involve some filtering, and in the case of the CSP signal, updating a counter (CSP counter) to reflect the number of pulses that have occurred since the last execution of the routine.

If the CLUTCH ON flag indicates that clutch 16 is being commanded to an engaged state and the COMPRESSOR RUNNING flag has not been set, as determined at blocks 122 and 124, respectively, the blocks 126–128 are executed to monitor the CSP pulses to verify that compressor 12 is actually beginning to operate. If no CSP pulses have been received in the first 100 msec of clutch operation, the block 126 is answered in the affirmative, indicating that the compressor has not started operating; in such event, the block 130 is executed to set a compressor-off-abnormal diagnostic indication. However, if at least one pulse is received within the 100 msec interval, the block 128 is answered in the affirmative, and the blocks 132–134 are executed to set the compressor running flag and to set a compressor-on-normal diagnostic indication, completing the routine. Once the COMPRESSOR RUNNING flag has been set, the block 124 is answered in the affirmative, and the blocks 126, 128, 132, 134 are skipped.

If the clutch 16 is on and compressor operation has commenced, the blocks 136–140 are executed to determine if the compressor is running at a normal speed. The block 136 determines the compressor speed CS based on the number of CSP pulsations received over a given interval of time, or in other words, the pulsation frequency. In a six-cylinder compressor, for example, six pulses will be received for each revolution of the compressor, and the compressor speed will be computed as one-sixth of the number of CSP pulses per unit time. If the compressor speed CS is less than a reference such as 50 RPM, as determined at block 138, the block 130 is executed to set the compressor-off-abnormal diagnostic indication, completing the routine. If the compressor speed CS is at least 50 RPM, block 140 is executed to determine if there is excessive clutch slippage; this is achieved by computing the clutch slip magnitude based on compressor speed CS, engine speed ES, and the compressor/engine pulley ratio PR, and comparing the computed slip to a threshold THR. As indicated at block 140, the magnitude of slip is computed according to the expression $|CS-(ES*PR)|$, where the quantity $(ES*PR)$ is the expected running speed of compressor 12 based on engine speed ES. If the slip magnitude exceeds the threshold THR, the block 142 is executed to set a compressor-on-abnormal diagnostic indication, completing the routine.

If the clutch has been commanded off for at least a reference interval such as 100 msec, as determined by blocks 122 and 144, the blocks 146 and 148 are executed to compute the compressor speed (as described above) and to compare the compressor speed to a reference speed such as 50 RPM. If the compressor speed is greater than 50 RPM, the block 142 is executed to set the compressor-on-abnormal diagnostic indication, completing the routine. If not, the blocks 150 and 152 are executed to clear the COMPRESSOR RUNNING flag and to set a compressor-off-normal diagnostic indication, completing the routine.

In summary, the control of this invention enables reliable and cost-effective diagnosis of the compressor operation by utilizing existing but formerly un-used sensor information. The pulsations of the high side pressure sensor 46 are used not only to verify that the compressor is actually working, but also to determine the running speed of the compressor.

This enables the diagnostic algorithm to verify proper starting and stopping of the compressor, and in conjunction with the engine speed information, to detect excessive clutch slippage.

While the present invention has been described in reference to the illustrated embodiments, it is expected that various modification in addition to those mentioned above will occur to those skilled in the art. For example, the pressure sensor 46 may alternatively be located at the outlet of condenser 20, or elsewhere upstream of the orifice tube 22, and the system 10 may be a heat pump as opposed to the arrangement depicted in FIG. 1. Also, the various reference time intervals, time constants, and so on, are representative only, and may vary from application to application. Thus, it will be understood that systems and methods incorporating these and other modifications may fall within the scope of this invention, which is defined by the appended claims.

What is claimed is:

1. A diagnostic method for an automotive air conditioning system including a refrigerant compressor, a clutch coupling the compressor to a rotary drive source, a pressure transducer response to a refrigerant pressure produced by the compressor, and a control unit responsive to an output signal produced by said pressure transducer for selectively activating said clutch to operate the compressor and de-activating said clutch to turn off the compressor, the diagnostic method including the steps of:

isolating a pulsating component of the pressure transducer output signal, the pulsating component corresponding to pressure pulses produced during operation of said compressor, and producing pulses based on said pulsating component;

detecting activation of said clutch by said control unit; and monitoring the produced pulses to verify that the compressor is actually operating in response to the detected activation of said clutch.

2. The diagnostic method of claim 1, including the steps of:

identifying an initial activation of said clutch by said control unit; and detecting an abnormal condition if no pulses are produced within a predetermined interval after the identified initial activation.

3. The diagnostic method of claim 1, including the steps of:

identifying an initial de-activation of said clutch by said control unit; and detecting an abnormal condition if pulses of at least a reference frequency are produced following a predetermined interval after the identified initial de-activation.

4. A diagnostic method for an automotive air conditioning system including a refrigerant compressor, a clutch coupling the compressor to a rotary drive source, a pressure transducer response to a refrigerant pressure produced by the compressor, and a control unit responsive to an output signal produced by said pressure transducer for selectively activating said clutch to operate the compressor and de-activating said clutch to turn off the compressor, the diagnostic method including the steps of:

isolating a pulsating component of the pressure transducer output signal, the pulsating component corresponding to pressure pulses produced during operation of said compressor, and producing pulses based on said pulsating component;

determining a running speed of the compressor based on a frequency of the produced pulses;

detecting activation and de-activation of said clutch by said control unit; and monitoring the determined running speed to verify that the compressor is operating in accordance with the detected activation and de-activation of said clutch by said control unit.

5. A diagnostic method for an automotive air conditioning system including a refrigerant compressor, a clutch coupling the compressor to a rotary drive source, a pressure transducer response to a refrigerant pressure produced by the compressor, and a control unit responsive to an output signal produced by said pressure transducer for selectively activating said clutch to operate the compressor and de-activating said clutch to turn off the compressor, the diagnostic method including the steps of:

isolating a pulsating component of the pressure transducer output signal, the pulsating component corresponding to pressure pulses produced during operation of said compressor, and producing pulses based on said pulsating component;

determining a running speed of the compressor based on a frequency of the produced pulses;

determining an expected running speed of said compressor based on a running speed of said rotary drive source; and detecting a condition of clutch slippage while said control unit is activating said clutch based on the determined and expected running speeds of the compressor.

6. The method of claim 5, including the step of:

detecting a condition of clutch slippage if:
   the determined running speed of the compressor exceeds a reference value; and
   the determined running speed of the compressor deviates from the expected running speed by more than a reference amount.

7. A diagnostic method for an automotive air conditioning system including a refrigerant compressor, a clutch coupling the compressor to a rotary drive source, a pressure transducer response to a refrigerant pressure produced by the compressor, and a control unit responsive to an output signal produced by said pressure transducer for selectively activating said clutch to operate the compressor and de-activating said clutch to turn off the compressor, the diagnostic method including the steps of:

isolating a pulsating component of the pressure transducer output signal, the pulsating component corresponding to pressure pulses produced during operation of said compressor, and producing pulses based on said pulsating component; and detecting an amplitude of the produced pulses as a diagnostic measure of a pumping capacity of said compressor.

* * * * *